(12) United States Patent
Thüerey et al.

(10) Patent No.: US 8,041,550 B1
(45) Date of Patent: Oct. 18, 2011

(54) TWO-WAY RIGID BODY COUPLING IN SHALLOW WATER SIMULATIONS

(75) Inventors: Nils Thüerey, Zurich (CH); Matthias Müller-Fischer, Stäfa (CH); Simon Schirm, Zürich (CH); Markus Gross, Uster (CH)

(73) Assignee: NVIDIA Corporation, Santa Clara, CA (US)

( * ) Notice: Subject to any disclaimer, the term of this patent is extended or adjusted under 35 U.S.C. 154(b) by 549 days.

(21) Appl. No.: 12/180,457

(22) Filed: Jul. 25, 2008

(51) Int. Cl.
  *G06G 7/48* (2006.01)
  *G06G 7/56* (2006.01)
  *G06G 7/50* (2006.01)
(52) U.S. Cl. ............................................. 703/9; 703/5
(58) Field of Classification Search .................. 703/5, 9
  See application file for complete search history.

(56) References Cited

U.S. PATENT DOCUMENTS

| | | | |
|---|---|---|---|
| 7,373,284 B2 * | 5/2008 | Stabelfeldt et al. ............... | 703/2 |
| 2001/0044706 A1 * | 11/2001 | Yoshikawa et al. ............... | 703/1 |

OTHER PUBLICATIONS

Miklos, "Real-Time Fluid Simulation Using Height Fields", Summer 2004, Computer Graphics Lab, ETH Zurich, 42 pages*
Chen, et al. "Two-Dimensional Navier-Stokes Simulation of Breaking Waves," 1999.
Chen, et al. "Real-Time Fluid Simulation in a Dynamic Virtual Environment," IEEE Computer Graphics and Applications, vol. 19, No. 3, pp. 52-61 (May-Jun. 1997).
Enright, et al. "Animation and Rendering of Complex Water Surfaces," ACM Trans. Graph., 21(3):736-744, 2002.
Foster, et al. "Practical Animation of Liquids," In Proc. of ACM SIGGRAPH. 2001.
Foster, et al. "Realistic Animation of Liquids," Graphical Models and Image Processing, 1996.
Fournier, et al. "A Simple Model of Ocean Waves," In SIGGRAPH '86: Proceedings of the 13th annual conference on Computer graphics and interactive techniques, pp. 75-84, New York, NY, USA, 1986.
Hagen, et al. "Visual Simulation of Shallow-Water Waves," Simulation Modeling Practice and Theory, Sep. 13, 2005.
Hinsinger, et al. "Interactive Animation of Ocean Waves," Jul. 2002.
Irving, et al. "Efficient Simulation of Large Bodies of Water by Coupling Two and Three Dimensional Techniques," ACM Trans. Graph., 25, 2006.
Jeschke, et al. "A Procedural Model for Interactive Animation of Breaking Ocean Waves," WSCG Posters Proceedings, Plzen, Czech Republic , Feb. 2003.
Kass, et al. "Rapid, Stable Fluid Dynamics for Computer Graphics," ACM Trans. Graph., 24(4):49-55, 1990.

(Continued)

*Primary Examiner* — David Silver
(74) *Attorney, Agent, or Firm* — Patterson & Sheridan, LLP (57) ABSTRACT

One embodiment of the present invention sets forth a technique for computing two-way rigid body coupling in a two-dimensional height field simulation, such as a shallow water simulation. Coupling from a rigid body to a fluid is computed using fluid displacement of the body in each grid cell. The body is projected onto a simulation plane to determine which grid cells are covered by the body. Fluid displacement from the body is computed for each grid cell based on displacement within a corresponding vertical column of fluid. Fluid displacement is distributed to neighboring grid cells prior to a height field computation. Coupling from the fluid to the rigid body is computed by integrating forces imparted on the body by the fluid at each grid cell. The integrated forces are used to compute a new position for the body in a subsequent simulation time step.

20 Claims, 5 Drawing Sheets

OTHER PUBLICATIONS

Klein, et al. "Simulation, Modeling and Rendering of Incompressible Fluids in Real Time," 2003.
Layton, et al. "A Numerically Efficient and Stable Algorithm for Animating Water Waves," The Visual Computer, 18/1:41-53, 2002.
Loviscach, Jorn. "Complex Water Effects at Interactive Frame Rates," Journal of WSCG, 11:298-305, 2003.
Maes, et al. "Efficient Animation of Water Flow of Irregular Terrains," GRAPHITE 2006, pp. 107-115, 2006.
Mihalef, et al. "Animation and Control of Breaking Waves," Proc. of the ACM SIGGRAPH/ Eurographics Symposium of Computer Animation, pp. 315-324, 2004.
O'Brien, et al. "Dynamic Simulation of Splashing Fluids," Computer Animation 1995, Geneva, Switzerland, Apr. 1995.
Peachey, Darwyn R. "Modeling Waves and Surf," in SIGGRAPH '86: Proceedings of the 13$^{th}$ annual conference on Computer graphics and interactive techniques, pp. 65-74, New York, NY, USA, 1986.
Stam, Jos. "Stable Fluids," Proc. of ACM SIGGRAPH, pp. 121-128, 1999.
Takahashi, et al. "Realistic Animation of Fluid With Splash and Foam," Computer Graphics Forum, 22 (3), 2003.
Tessendorf, Jerry. "Simulating Ocean Water," SIGGRAPH 2004 Course Notes 31, 2004.
Thurey, et al. "Animation of Open Water Phenomena with Coupled Shallow Water and Free Surface Simulations," Proc. of the ACM SIGGRAPH / Eurographics Symposium on Computer Animation, 2006.
Wang, et al. "Efficient Rendering of Breaking Waves Using MPS Method," Journal of Zhejiang University Science A, Jun. 2006.

* cited by examiner

TWO-WAY RIGID BODY COUPLING IN SHALLOW WATER SIMULATIONS

BACKGROUND OF THE INVENTION

1. Field of the Invention

Embodiments of the present invention relate generally to physics simulation systems and more specifically to two-way rigid body coupling for shallow water simulations.

2. Description of the Related Art

Fluid simulation systems have undergone significant improvements recently with respect to visual accuracy in various settings, such as interactions between materials. However, most of these improvements are not available to interactive, real-time environments, such as games. One major barrier to implementing recent techniques in real-time environments is a large computational throughput that is needed for solving full three-dimensional (3D) fluid motion, and tracing free surfaces for rendering.

One approach to increasing simulation performance in fluid simulations is to reduce the problem from three dimensions to two dimensions. Instead of using 3D grid cells, a fluid is represented by a two-dimensional (2D) height field comprising 2D grid cells, each with an associated height. For calm situations (e.g., smooth waves and ripples), this representation can capture principle visual properties of a free surface fluid.

In addition to simulating fluids, many simulation scenarios also involve two-way rigid body coupling (interaction) with fluid surfaces. A strait forward approach for simulating rigid bodies interacting with a fluid surface is to have the rigid body push down against fluid columns beneath the rigid body. To conserve water volume, fluid that is added to or removed from each column or grid cell is compensated for in neighboring grid cells of the fluid simulation. This technique yields acceptable waves for two-way rigid body coupling between substantially floating objects and the surface of a corresponding fluid. However, this technique does not accommodate a more general scenario of two-way rigid body coupling involving a submerged rigid body. For example, if a rigid body is pulled under a fluid surface, this technique does not realistically yield a debit in the fluid of a size and shape corresponding to the rigid body, as would be expected in a natural setting.

As the foregoing illustrates, what is needed in the art is a technique for efficiently computing two-way rigid body coupling for both floating and submerged objects within a real-time simulation.

SUMMARY OF THE INVENTION

One embodiment of the present invention sets forth a method for computing a two-way rigid body coupling. The method includes the steps of projecting a rigid body onto a two-dimensional simulation plane to identify a plurality of covered grid cells, computing a current displacement value for each covered grid cell, and computing a difference displacement value for each covered grid cell based on the current displacement value and a previous displacement value. The method also includes the steps of, for each covered grid cell, distributing the difference displacement value to one or more neighboring grid cells, for each covered grid cell, computing new height field values based on previous height field values and the distributed difference displacement value related to the covered grid cell, and storing the new height field values in memory for rendering.

One advantage of the disclosed method is that it provides a technique for efficiently computing a two-way rigid body coupling for both floating and submerged objects that can be effectively implemented in a real-time simulation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
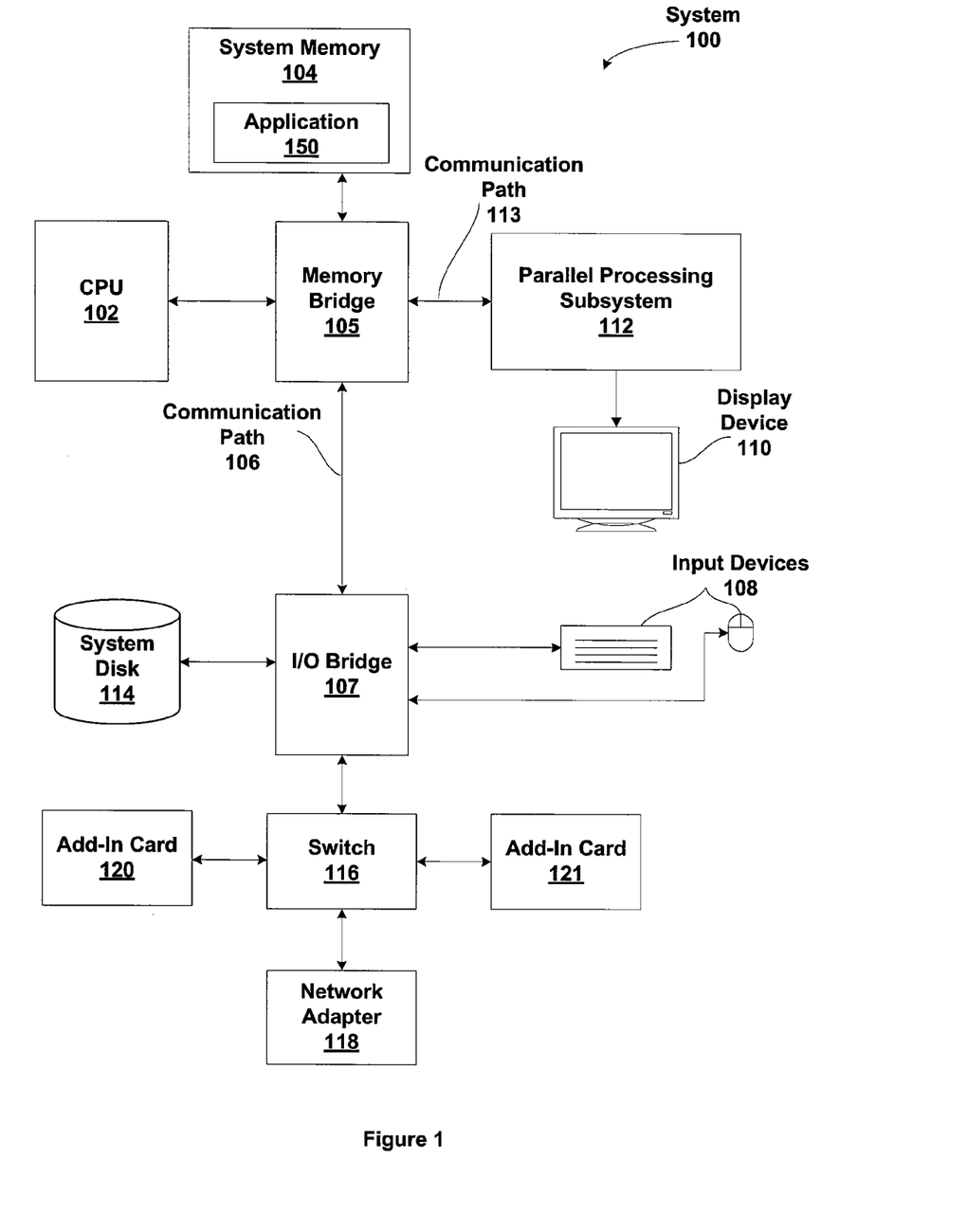
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

Application 150 may perform certain processing steps and may program the parallel processing subsystem 112 to perform related processing steps. For example, application 150, in conjunction with parallel processing subsystem 112, may generate graphics images to be displayed on display device 110, or stored to disk system 114.

Persons skilled in the art will understand that the architecture described in FIG. 1 in no way limits the scope of the present invention and that the techniques taught herein may be implemented on any properly configured processing unit, including, without limitation, one or more CPUs, one or more multi-core CPUs, one or more GPUs, one or more multi-core GPUs, or the like, without departing the scope of the present invention.

Figure 2A:
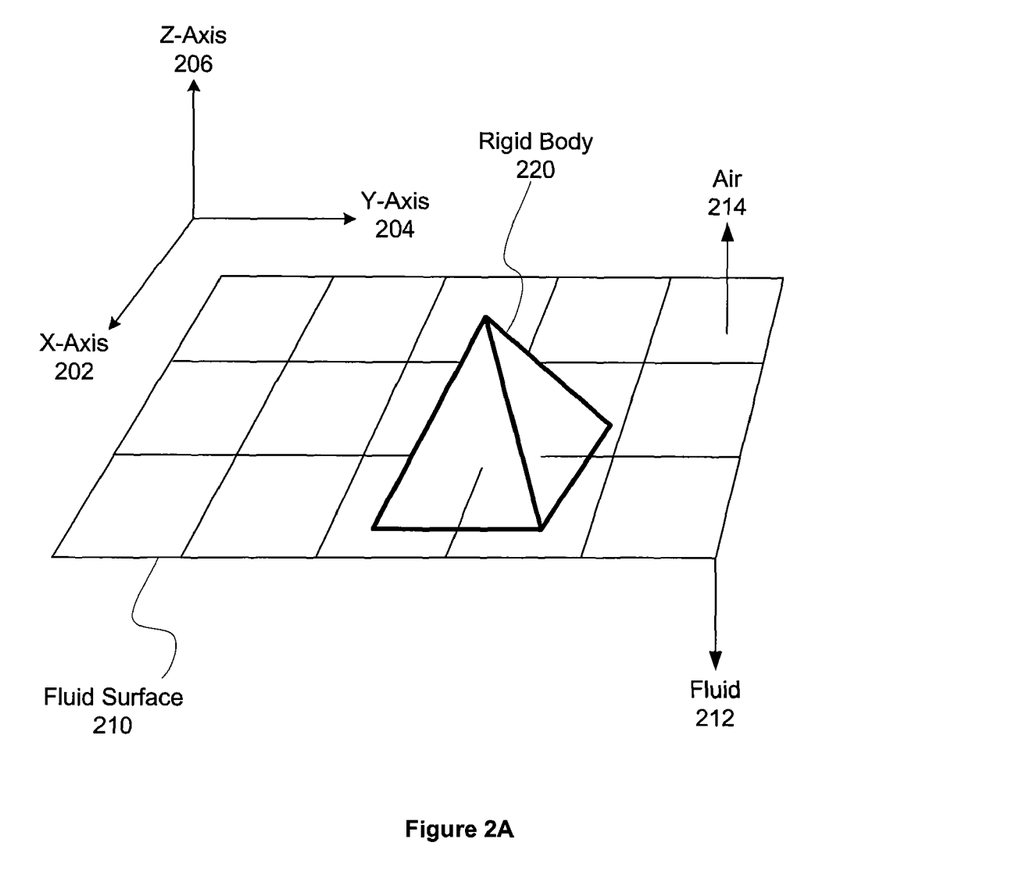
FIG. 2A illustrates a rigid body that is partially submerged in fluid.

FIG. 2A illustrates a rigid body 220 that is partially submerged in fluid 212. An x-y plane defined by an x-axis 202 and a y-axis 204 may be used as a 2D simulation plane for 2D height field simulations. Gravity is defined to act along a z-axis 206. A fluid surface 210 defines the boundary between fluid 212 and air 214. The fluid surface 210 may be represented by a height field, calculated using a shallow water simulation.

Shallow water (SW) simulations reduce complex three-dimensional (3D) fluid models to a simplified representation comprising a two-dimensional (2D) height field. The 2D height field is typically represented using a mesh of adjacent grid cells, each comprising a fluid height and a ground surface height. Equations used to describe the 2D height field may be derived from Navier-Stokes (NS) equations, which are well known to properly characterize full 3D fluid flow.

One simplifying assumption for deriving height field equations from NS equations is that fluid velocity does not vary significantly along the z-axis 206, and that a pressure gradient is constant from a fluid surface to a bottom surface. Thus, gravity and fluid pressure and the primary driving forces within a simulation. An additional simplifying assumption is that any fluid (such as water) undergoing simulation has effectively zero viscosity, so that well known Euler equations are valid. In this way, viscosity terms in the NS equations may be neglected.

The SW simulation may be performed using simplified shallow water Equations 1-3, below. A simplified notation for partial derivatives is used herein, whereby "$f_n$" denotes a partial derivative of function f along n, where n may be a spatial axis or time. A height value that describes water height above a ground surface terrain at point X is given as h(X, t), where t is time. The ground surface terrain is given by o(X), and the total height of water and ground surface terrain is given by H(X, t)=h(X, t)+o(X). A vector u=(u, v) describes a horizontal velocity of fluid in the SW simulation, and g is a gravitational force perpendicular (along the z-axis) to the 2D simulation plane. A 2D simulation region within the 2D simulation plane comprises N(X) grid cells within a size of Δx and Δy along the x-axis and y-axis, respectively. Equations 1 through 3 describe a process to compute a new height field at a given location on the 2D simulation plane for time t at point X.

$$H_t = -\underline{u} \cdot \nabla H - H(u_x + v_y) \quad \text{(Equation 1)}$$

Where, $$u_t = -\underline{u} \cdot \nabla u - g h_x \quad \text{(Equation 2)}$$

$$v_t = -\underline{u} \cdot \nabla v - g h_y \quad \text{(Equation 3)}$$

A staggered grid combined with a semi-Lagrangian advection step may be used to solve Equations 1-3. These equations describe a shallow water simulation that directly yields a full velocity field for the surface. This velocity field may be used to trace objects floating on the surface, and may be extended to incorporate a variety of boundary conditions to capture interesting flow effects such as flows through terrains and vortices behind obstacles to a flow.

Figure 2B:
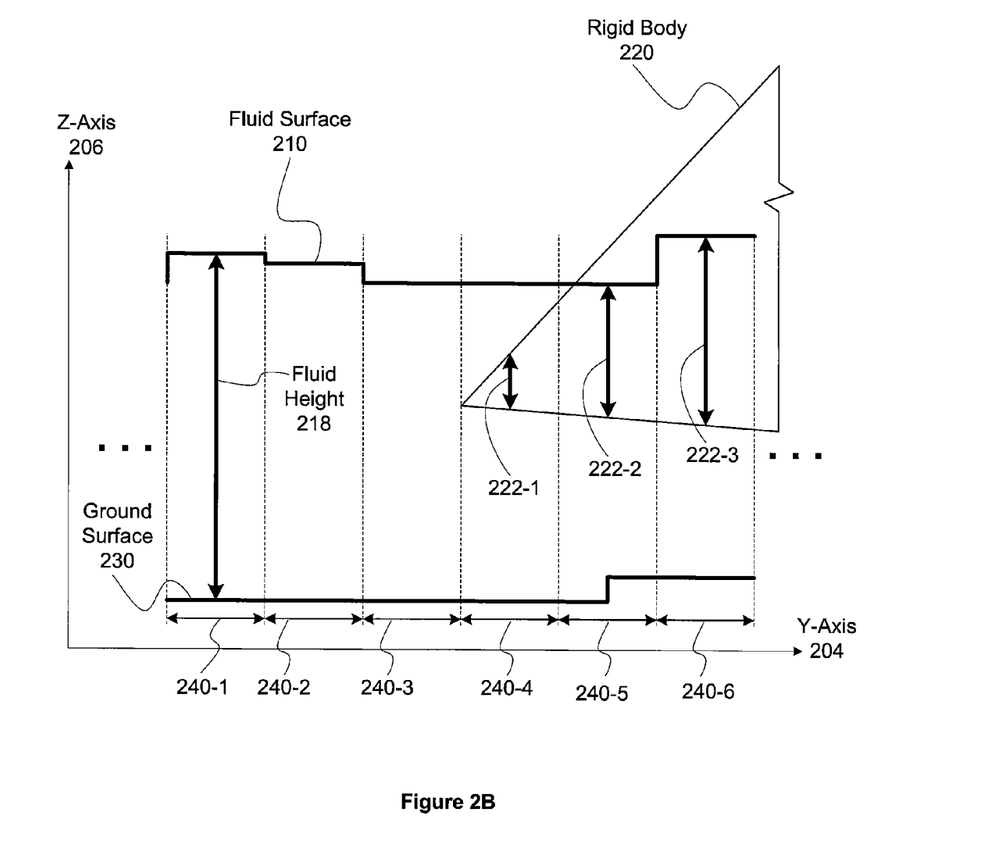
FIG. 2B illustrates a cross sectional view of fluid displacement by the rigid body, according to one embodiment of the invention.

FIG. 2B illustrates a cross sectional view of fluid displacement by the rigid body 220, according to one embodiment of the invention. The fluid surface 210 comprises a set of total height values H that are associated with grid cells 240 and calculated as described in FIG. 2A as a sum of fluid height 218 and ground surface 230 height.

The rigid body 220 is projected onto the 2D simulation plane to determine which grid cells 240 are covered by the rigid body 220. In this example, rigid body 220 covers grid cells 240-4 through 240-6 along the y-axis, in a cross section plane defined by an x value and a y-z plane defined by the y-axis 204 and the z-axis 206. At each grid cell 240-4 through 240-6, a fluid displacement value 222 is computed to represent the amount of fluid displaced by the rigid body 220 within the column of fluid represented by the grid cell. For example, in grid cell 240-4, the rigid body 220 displaces a volume corresponding to displacement value 222-1 multiplied by the area of grid cell 240-4. Importantly, the rigid body may be either completely submerged or partially submerged for this computation to be valid.

Figure 2C:
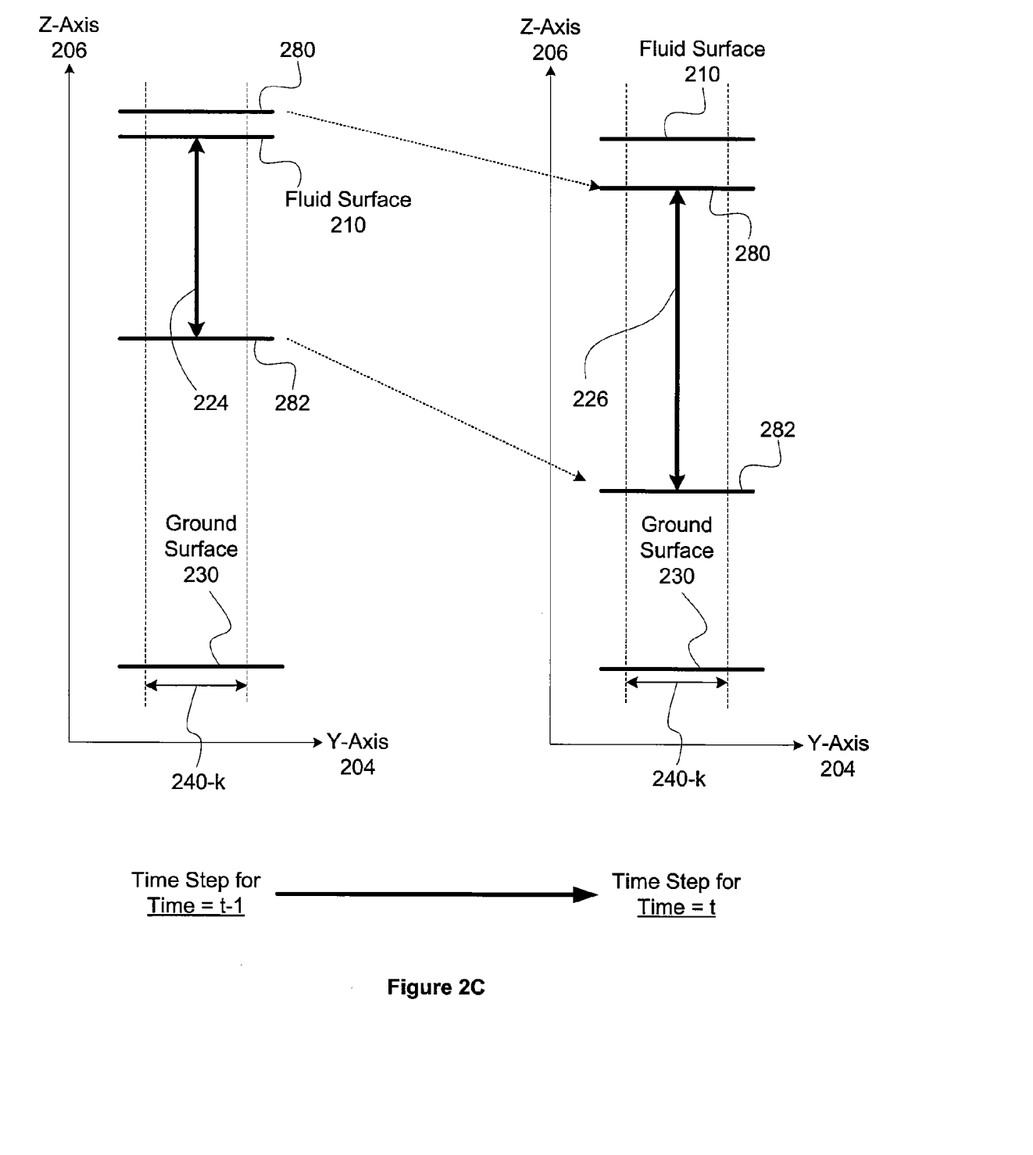
FIG. 2C illustrates fluid displacement by the rigid body in two sequential time steps, according to one embodiment of the invention.

FIG. 2C illustrates fluid displacement by the rigid body 220 in two sequential time steps, according to one embodiment of the invention. Movement of the rigid body 220 as well as fluid surface is computed according to time steps. As the rigid body 220 moves in sequential time steps (..., t−1, t, t+1, ...), fluid displacement by rigid body 220 for a given grid cell may change according to movements of the rigid body 220. For example, in time step (t−1), rigid body 220 includes a top vertical extent 280 and a bottom vertical extent 282 within an area defined by grid cell 240-k. A fluid displacement value 224 is computed from the fluid surface 210 to the bottom vertical extent 282 of rigid body 220 to represent displacement of rigid body 220 within the vertical fluid column covered by grid cell 240-k.

In time step (t), the rigid body 220 has moved lower, so that the top vertical extent 280 is below the fluid surface 210, and a taller section of rigid body 220 has moved laterally into the region of the 2D simulation plane covered by grid cell 240-k. In time step (t), fluid displacement value 226 is computed from the top vertical extent 280 to the bottom vertical extent 282.

In addition to height value h(X), discussed in FIG. 2A, each grid cell also includes a displacement value b(X), which may incorporate displacement value 224 (at time step t−1) or displacement value 226 (at time step t). The displacement value b(X) is computed to include fluid volume displaced by one or more rigid bodies. At the beginning of a simulation time step, an area for each rigid body is projected onto the 2D simulation plane. For each grid cell covered by a projection of a rigid body, a corresponding displacement value b(X) is computed to include the sum of fluid displacement, along a vertical column defined by the given grid cell, of each rigid body covering the grid cell. For grid cells not covered by a projection of a rigid body, a corresponding displacement value b(X) of zero may be used. A displacement value b(X) at time (t) is represented by b(X,t).

Between sequential time steps, a difference displacement $\Delta b(X)=b(x, t)-b(x,t-1)$ indicates a change in displacement volume for a given grid cell. The difference displacement is distributed to neighboring cells. In one embodiment, the difference displacement is distributed equally to four neighboring cells, as expressed in Equation 4, where X is a position of a grid cell with difference displacement b(X,t) and X' is a position of a neighboring grid cell.

$$h(X', t+1) = h(X', t) + \alpha \frac{\Delta b(X)}{4} \quad \text{(Equation 4)}$$

Positions of the four neighboring grid cells are given by $X+(\pm\Delta X, 0)$ and $X+(0, \pm\Delta X)$, respectively. This technique generally conserves volume for $0<\alpha<1$. Amplitude values for waves generated by rigid bodies may be adjusted by adjusting $\alpha$. Larger values of $\alpha$ generate larger waves from corresponding rigid body movements.

For coupling from the fluid to a rigid body, a force F of the fluid displacement and fluid velocity at each grid node may be computed using Equation 5, where $\rho$ is a constant corresponding to the fluid density, $h_b$ is a rigid body vertical extent equal to a top vertical extent minus a bottom vertical extent.

$$F = h_b \underline{u}(X) + g\Delta x \Delta y b(X) \rho \quad \text{(Equation 5)}$$

Integrating forces F over a region of the rigid body and over time will result in appropriate motion imparted on the rigid body from the fluid. For example, a rigid body may sink, float, or follow currents defined by fluid velocities.

Figure 3:
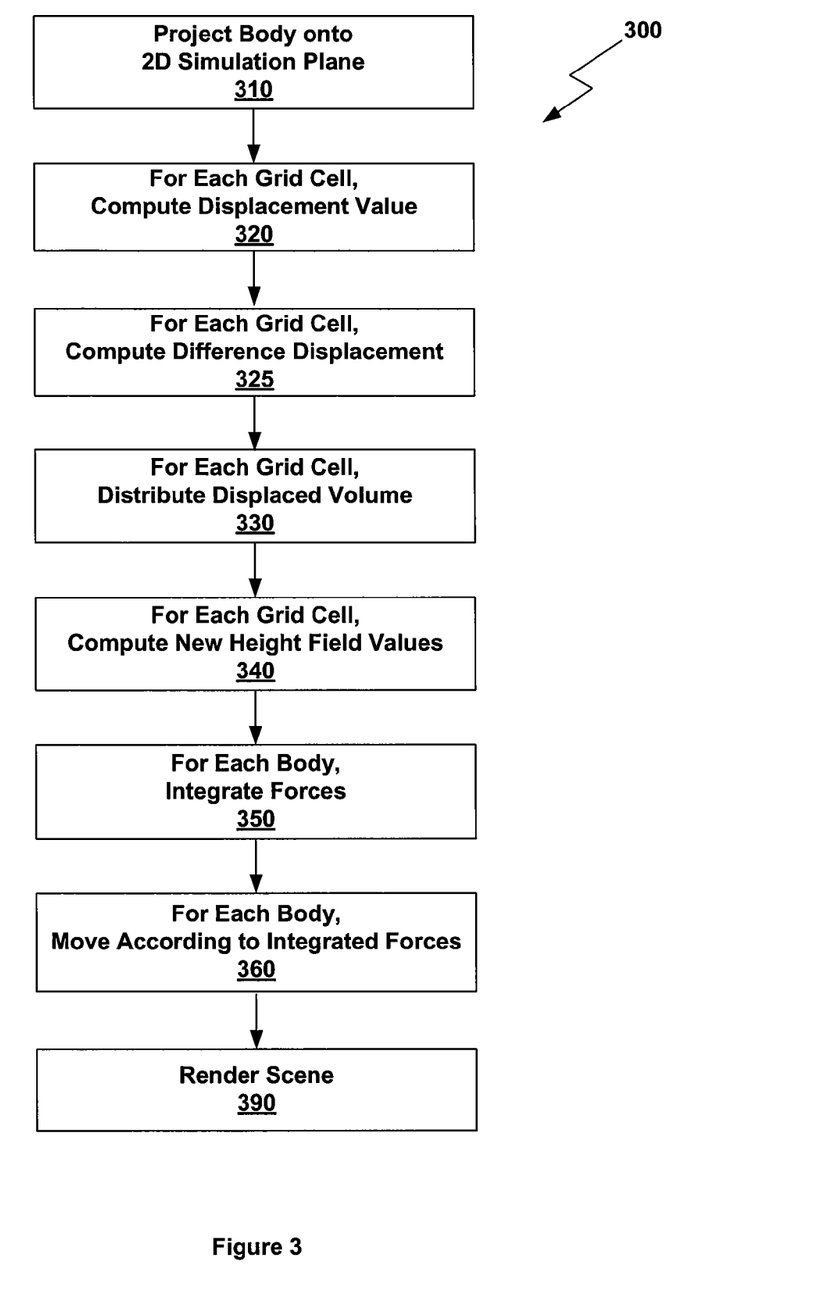
FIG. 3 is a flow diagram of method steps for computing two-way rigid body coupling, according to one embodiment of the invention.

FIG. 3 is a flow diagram of method steps 300 for computing two-way rigid body coupling, according to one embodiment of the invention. Although the method steps are described in conjunction with the systems of FIG. 1, persons skilled in the art will understand that any system configured to perform the method steps, in any order, is within the scope of the invention. The method is performed for sequential time steps, starting with an initial time step and continuing for the lifetime of a simulation session. The simulation session may be executed in relation to a software application executing on a host, such as application 150 of FIG. 1.

The method begins in step 310, where the application projects a rigid body onto a 2D simulation plane. In step 320, for each grid cell the application computes a displacement value from each rigid body covering the grid cell. In step 325, the application computes a difference displacement for time step (t+1) based on a previous displacement value at time (t−1) and a current displacement value at time step (t). In step 330, for each grid cell the application distributes a corresponding difference displacement value to neighboring grid cells. In step 340, for each grid cell the application computes new height field values, including, for example, fluid height and velocity. In step 350, for each rigid body the application integrates fluid forces for the rigid body, expressed in Equation 5, using any technically feasible integration technique. In step 360, for each rigid body, the application perturbs the position of the rigid body according to forces integrated in step 350. Each rigid body should also include an associated mass, which, in combination with the integrated forces, determines the motion of the rigid body. Persons skilled in the art will recognize that various techniques may be used to integrate forces applied to a given rigid body and various related techniques may be used to compute resulting movements of the rigid body. The method terminates in step 390, where the application renders a graphics scene comprising any visible fluid surface and any visible portion of each rigid body.

In sum, a technique for computing two-way rigid body coupling is disclosed for two-dimensional height field simulations incorporating rigid bodies that interact with the height field. A rigid body is projected onto the two-dimensional height field to determine which grid cells are covered by the rigid body. A displacement value is computed for each covered grid cell. Displaced volume is distributed to each of four surrounding grid cells prior to a new height field computation for the grid cells. Coupling from the fluid to the rigid body is computed by integrating forces from each covered grid cell to the rigid body. The position of the rigid body is perturbed according to the integrated forces. A graphics scene may be rendered from the any visible resulting fluid surface and any visible rigid body or bodies.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for computing a two-way rigid body coupling, the method comprising:

projecting a rigid body onto a two-dimensional simulation plane to identify a plurality of covered grid cells;

computing a current displacement value for each covered grid cell;

computing a difference displacement value for each covered grid cell based on the current displacement value and a previous displacement value;

for each covered grid cell, distributing the difference displacement value to one or more neighboring grid cells;

for each covered grid cell, computing new height field values based on previous height field values and the distributed difference displacement value related to the covered grid cell; and storing the new height field values in memory for rendering.

2. The method of claim 1, further comprising the steps of:
computing an individual force value for each of the covered grid cells;
computing an integrated force value from the individual force values; and
perturbing the rigid body based on the integrated force value.

3. The method of claim 2, wherein the new height field values include a fluid height, a fluid velocity, and at least one current displacement value.

4. The method of claim 3, wherein the step of computing a current displacement value for a covered grid cell comprises determining a distance covered by the rigid body along a vertical fluid column defined by the covered grid cell.

5. The method of claim 4, wherein the step of computing a difference displacement value for a covered grid cell comprises subtracting the current displacement value from the previous displacement value.

6. The method of claim 5, wherein the step of distributing the difference displacement value for a covered grid cell comprises adding to each of four neighboring grid cells one fourth of the difference displacement value related to the covered grid cell multiplied by a first coefficient.

7. The method of claim 6, wherein the value of the first coefficient is between zero and one.

8. The method of claim 2, wherein the step of computing an integrated force value comprises integrating a force term that is equal to the sum of:
a first product, which is equal to a rigid body vertical extent term multiplied by a velocity term, and
a second product, which is equal to a displacement term multiplied by a fluid density term multiplied by gravity term multiplied by the sum of two distance terms.

9. The method of claim 2, wherein the step of perturbing the rigid body accounts for the mass of the rigid body.

10. The method of claim 1, further comprising the step of rendering a graphics scene that includes one or more visible portions of the rigid body.

11. A computer-readable medium including instructions that, when executed by a processing unit, cause the processing unit to compute a two-way rigid body coupling, by performing the steps of:
projecting a rigid body onto a two-dimensional simulation plane to identify a plurality of covered grid cells;
computing a current displacement value for each covered grid cell;
computing a difference displacement value for each covered grid cell based on the current displacement value and a previous displacement value;
for each covered grid cell, distributing the difference displacement value to one or more neighboring grid cells;
for each covered grid cell, computing new height field values based on previous height field values and the distributed difference displacement value related to the covered grid cell; and
storing the new height field values in memory for rendering.

12. The computer-readable medium of claim 11, further comprising the steps of:
computing an individual force value for each of the covered grid cells;
computing an integrated force value from the individual force values; and
perturbing the rigid body based on the integrated force value.

13. The computer-readable medium of claim 12, wherein the new height field values include a fluid height, a fluid velocity, and at least one current displacement value.

14. The computer-readable medium of claim 13, wherein the step of computing a current displacement value for a covered grid cell comprises determining a distance covered by the rigid body along a vertical fluid column defined by the covered grid cell.

15. The computer-readable medium of claim 14, wherein the step of computing a difference displacement value for a covered grid cell comprises subtracting the current displacement value from the previous displacement value.

16. The computer-readable medium of claim 15, wherein the step of distributing the difference displacement value for a covered grid cell comprises adding to each of four neighboring grid cells one fourth of the difference displacement value related to the covered grid cell multiplied by a first coefficient.

17. The computer-readable medium of claim 16, wherein the value of the first coefficient is between zero and one.

18. The computer-readable medium of claim 12, wherein the step of computing an integrated force value comprises integrating a force term that is equal to the sum of:
a first product, which is equal to a rigid body vertical extent term multiplied by a velocity term, and
a second product, which is equal to a displacement term multiplied by a fluid density term multiplied by gravity term multiplied by the sum of two distance terms.

19. The computer-readable medium of claim 12, wherein the step of perturbing the rigid body accounts for the mass of the rigid body.

20. The computer-readable medium of claim 11, further comprising the step of rendering a graphics scene that includes one or more visible portions of the rigid body.

* * * * *